US008627572B2

(12) United States Patent
Martinsson et al.

(10) Patent No.: US 8,627,572 B2
(45) Date of Patent: Jan. 14, 2014

(54) COASTING BRAKE ARRANGEMENT FOR A POWER TOOL

(75) Inventors: Par Martinsson, Jonkoping (SE); Lars Andersson, Vastra Frolunda (SE); Thomas Engman, Mullsjo (SE); Bjorn Rosberg, Jonkoping (SE)

(73) Assignee: Husqvarna AB, Huskvarna (SE)

( * ) Notice: Subject to any disclaimer, the term of this patent is extended or adjusted under 35 U.S.C. 154(b) by 610 days.

(21) Appl. No.: 12/744,911

(22) PCT Filed: Nov. 25, 2008

(86) PCT No.: PCT/SE2008/051344
§ 371 (c)(1),
(2), (4) Date: Sep. 24, 2010

(87) PCT Pub. No.: WO2009/070102
PCT Pub. Date: Jun. 4, 2009

(65) Prior Publication Data

US 2011/0061246 A1 Mar. 17, 2011

Related U.S. Application Data

(63) Continuation of application No. PCT/SE2008/051344, filed on Nov. 25, 2008.

(30) Foreign Application Priority Data

Nov. 26, 2007 (WO) ................. PCT/SE2007/001039

(51) Int. Cl.
*B23D 57/02* (2006.01)
*B26B 17/00* (2006.01)

(52) U.S. Cl.
USPC .................... 30/383; 30/381; 30/183; 30/189

(58) Field of Classification Search
USPC ........... 30/380–390, 183–184, 189–190, 286; 188/166; 83/68, 58, 62.1; 56/10.5
See application file for complete search history.

(56) References Cited

U.S. PATENT DOCUMENTS 4,367,813 A * 1/1983 Wieland et al. ............. 192/17 R
4,594,780 A * 6/1986 Schliemann et al. ........... 30/382

(Continued)

FOREIGN PATENT DOCUMENTS

GB 2413525 B 4/2006
WO 2008057099 A1 5/2008

OTHER PUBLICATIONS

International Search Report; PCT/SE2008/051344; Feb. 10, 2009.

(Continued)

*Primary Examiner* — Ghassem Alie
*Assistant Examiner* — Bharat C Patel
(74) *Attorney, Agent, or Firm* — Novak Druce Connolly Bove + Quigg LLP

(57) ABSTRACT

A chainsaw having a brake arrangement comprising: a kickback brake drum (10) arranged to rotate together with a drive sprocket driving a saw chain of a chainsaw, a kickback brake for quickly stopping the saw chain if at least one kickback actuator (7) is actuated, the kick back brake including a kickback brake band (11) extending around the kickback brake drum (10) and means for tightening the kickback brake band (17-19, 22) around the kickback brake drum (10), and; a coasting brake weaker than the kickback brake being arranged to brake the saw chain (2) unless a coasting actuator of the chainsaw is actuated, the coasting brake includes a coasting brake band extending around a coasting brake drum (10) arranged to rotate together with the drive sprocket (37), and means for tightening the coasting brake band (20, 22, 23) around the coasting brake drum, wherein the coasting brake band is either at least one longitudinally slit portion (**11*b***) of the kickback brake band or a separate brake band.

9 Claims, 16 Drawing Sheets

(56) References Cited

U.S. PATENT DOCUMENTS

| | | | | |
|---|---|---|---|---|
| 4,683,660 | A * | 8/1987 | Schurr | 30/382 |
| 4,882,844 | A * | 11/1989 | Stokan | 30/381 |
| 4,889,213 | A * | 12/1989 | Roller | 477/204 |
| 5,480,009 | A * | 1/1996 | Wieland et al. | 188/77 W |
| 5,813,123 | A * | 9/1998 | Wieland et al. | 30/382 |
| 5,915,795 | A * | 6/1999 | Nakamura et al. | 30/382 |
| 6,493,948 | B2 * | 12/2002 | Luegger et al. | 30/382 |
| 8,051,743 | B2 * | 11/2011 | Kullberg et al. | 74/502.2 |
| 2005/0247178 | A1 * | 11/2005 | Hetcher et al. | 83/581 |

OTHER PUBLICATIONS

International Search Report; PCT/SE2007/001039; Aug. 15, 2008.

* cited by examiner

COASTING BRAKE ARRANGEMENT FOR A POWER TOOL

TECHNICAL FIELD

A coasting brake arrangement for a power tool such as a chain saw, brush cutter or power cutter having a work tool such as a saw chain or saw blade, which coasting brake arrangement includes a speed controlling throttle trigger member and a force transmitting member having one end operatively connected to the throttle trigger member and another end operatively connected to a first brake member, which is biased towards a cooperating rotary second brake member that rotates when the work tool is running, so that the work tool is free to run when the throttle trigger member is pushed in but braked when the throttle trigger member is released to make the first brake member press against the second brake member in order to prevent the work tool from running.

The present invention further relates to a chainsaw having a brake arrangement comprising:

- a saw chain wound around a guide bar, where said guide bar is an extension from a housing;
- a drive means for providing a rotary drive force to a drive sprocket around which said saw chain is wound;
- a kickback brake drum arranged to rotate together with the drive sprocket and the saw chain;
- a kickback brake for quickly stopping the saw chain if at least one kickback actuator is actuated, the kick back brake including at least one kickback brake band extending around the kickback brake drum and means for tightening the kickback brake band the kickback brake drum, and;
- a coasting brake weaker than the kickback brake being arranged to brake the saw chain unless a coasting actuator of the chainsaw is actuated.

The present invention also relates to a chainsaw having a brake arrangement comprising:

- a saw chain wound around a guide bar, where said guide bar is an extension from a housing;
- a drive means for providing a rotary drive force to a drive sprocket around which said saw chain is wound;
- a kickback brake for quickly stopping the saw chain if at least one kickback actuator is actuated,
- a coasting brake weaker than the kickback brake being arranged to brake the saw chain unless a coasting actuator of the chainsaw is actuated.

The term “throttle trigger member” as used herein is intended to cover both throttle trigger members for engines and for electric motors.

The word “toggle” usually is a reference to a kind of mechanism or joint consisting of two arms, which are almost in line with each other, connected with an elbow-like pivot. In a phrase like “toggle switch”, it specifically refers to one kind of mechanism that can be used to implement a positive “snap-action”. In the present context, the term “toggle-link mechanism” is used to designate a snap-action mechanism consisting of three links or arms, which are almost in line with one another and biased against one another along said line.

The words “front” and “rear” are used to designate relative locations along a longitudinal axis of a handheld power tool such as a chain saw, for example. In a chain saw, the saw chain guide bar is located at front end of the saw, while the opposite end is the rear end of the saw.

BACKGROUND ART

When starting a two-stroke engine of a chainsaw, there usually is some mechanism that raises the idling speed of the engine to facilitate the starting. When the engine is started and the user of the chainsaw grips around the rear handle of the saw, he releases the throttle trigger lock and can control the speed of the saw by the throttle trigger. The grip around the rear handle releases the speed raising mechanism, so that the saw now may idle at normal idling speed. However, due to the inertia of the movement of the saw chain, a run-in saw chain may continue running for a few seconds before it stops, and such continued running may be hazardous to the user, both at start and during working with the saw.

To reduce this hazard, U.S. Pat. No. 6,842,987 (Martinsson et al.) proposes a design having a brake triggering arm mounted at the rear handle of the chain saw and connected over a Bowden cable to a pivotable arm, which upon actuation pushes one link of a toggle-link mechanism sideways, so that the force of a kickback spring pulls the brake band tight around the brake drum. Thus, this design gives a manual third braking possibility in addition to a kickback triggered brake and an inertia triggered brake. While this manually operated design, if triggered, will prevent the chain from running at a start of the saw, it will also result in a hard, rapid stop of the chain movement if triggered at high speed, and the accompanying risk of getting a negative kickback, i.e. a downward swing of the tip of the saw chain guide bar. In addition, in course of time, such a brake arrangement will give rise to excessive wear of the brake band.

Further, chainsaws with a so-called kickback brake (also referred to as safety brake or emergency brake) releasable by a handguard have been around for a long time. For these saws, the run of the saw chain is stopped almost instantaneously for safety reasons when a dangerous situation takes place. Such a situation is for instance when a chain tooth at the upper quadrant of the guide bar tip cuts into wood without cutting through it whereby the chain cannot continue moving, and the bar is driven in an upward arc toward the operator; this situation is often referred to as a kickback. When the user’s hits the hand guard due to the kickback, the kickback brake is actuated. The kickback may also be released due to inertia of the kickback and/or by other levers than the handguard. U.S. Pat. No. 6,842,987 discloses a design for a kickback brake, hereby incorporated by reference.

There has also been proposed a so-called coasting brake, a chain brake that be actuated independently from the kickback brake. The coasting brake stops the saw chain quickly but without recoil preventing the saw chain to continue to run for a certain time because of the inertia of the saw, after having disconnected the drive. This coasting may cause damages to the saw chain when laying down the device. It may also pose a danger for the user of the saw after the user has released the throttle trigger. Therefore the actuation of the coasting brake is generally coupled with the throttle trigger or with the trigger lock. This means that, when actuating the throttle trigger or the trigger lock, the coasting brake is disengaged so that the saw chain can rotate and when releasing the throttle trigger, the brake is immediately actuated and the run of the chain is stopped.

U.S. Pat. No. 4,683,660, U.S. Pat. No. 5,813,123 and U.S. Pat. No. 6,493,948 belong to a first category where a brake band freely wound around a brake drum rotating with the drive sprocket around which the chain is wound. The coasting brake and the kickback brake are both arranged to pull at a same first free end of the brake band while the second end is fixedly secured to the engine housing of the chainsaw.

U.S. Pat. No. 5,915,795 and U.S. Pat. No. 7,200,941 belong to a second category where a brake band freely wound around a brake drum rotating with the drive sprocket around which the chain is wound, but where the kick back brake is arranged to pull at a first end of the brake band and the coasting brake is arranged to pull at the opposite second end of the brake band.

For both the first and second category a problem is that the wear of the brake band may be considerable during extensive use. Also the brake band may be smoothened during extensive use which may prolong the stopping times during a kickback, which of course is undesirable.

U.S. Pat. No. 5,791,057 shows an electric chainsaw with a kickback brake comprising a brake band freely wound around a brake drum rotating with the drive sprocket around which the chain is wound and a coasting brake comprising an shoe brake which can be engaged with periphery of the brake drum. Also U.S. Pat. No. 5,480,009 shows an electric chainsaw with a kickback brake comprising a brake band freely wound around a brake drum rotating with the drive sprocket around which the chain is wound, and with a coasting brake comprising an interior shoe brake positioned within the brake drum. However these brake arrangements may be too weak for gas chainsaws.

SUMMARY OF THE INVENTION

One object of the present invention is to provide a chainsaw coasting brake arrangement that will meet existing and expected safety regulations by stopping the chain of a chainsaw within one second after releasing the throttle trigger. This arrangement can also be used for other power tools, e.g. a brush cutter or a power cutter, but maybe with a different stopping time.

In a coasting brake arrangement of the kind referred to in the first paragraph above, this object is achieved in accordance with the present invention in that a mechanism connects said one end of the force transmitting member to the throttle trigger member and is designed to restrict the movement of the force transmitting member to an initial phase of the pushing in of the throttle trigger member.

Consequently, on pushing in the throttle trigger farther after the first phase of the pushing in thereof has passed, the trigger finger of the saw user will not have to overcome an increasing biasing force, and the user of the saw will experience the mechanism as having two distinct operating positions. The use of a mechanism having distinct operating positions is of vital importance to the quick braking of the saw chain speed to zero and will effectively contribute to the reduction of the braking period from two or a few seconds down to about one second or less. In addition, since only a low extra force is added by the mechanism, the normal function of the throttle trigger member is not affected by increased friction.

Advantageously, the throttle trigger member is mounted in a rear handle of the power tool and includes a throttle trigger button and an arm extending from the throttle trigger button in the direction of the rear handle, the arm having a free end that is journalled inside the rear handle to permit pivotal movement of the throttle trigger button, said mechanism including a cam and a cam follower that is operatively connected to said one end of the force transmitting member, the cam follower resting on the cam with the force transmitting member slackened to keep the brake members firmly pressed against each other when the throttle trigger button is released, but on pushing in the throttle trigger button, a relative movement between the cam and the cam follower causes the cam follower to pull the force transmitting member to separate the brake members from each other to release the work tool for rotation.

In a first preferred embodiment, the cam is carried by the pivotal arm, the force transmitting member is a force transmitting cable member of a Bowden cable, and said mechanism further includes a shaft member carried internally in the handle and located near the throttle trigger button, the cam follower being journalled on the shaft, said cam follower having a nose and a lock for said one end of the cable member, the cam follower nose resting on the cam when the throttle trigger button is released, but on pushing in the throttle trigger button, the cam lifts the cam follower nose to rotate the cam follower on the shaft member and thereby pull the cable member to separate the brake members from each other to release the work tool for rotation.

Then, it is suitable that the cam has a cam surface shaped as a part of a cylinder having a center identical with a pivotal axis of the throttle trigger arm, whereby on further pushing in of the throttle trigger button, the cam follower nose rests against the cam surface without rotating the cam follower further.

To reduce friction between the cam follower and the cam, it is also suitable that the cam follower nose has a rotary roller for reducing friction against the cam.

Suitably, the cam follower with its nose is provided with a groove serving as a guide for the cable member during the rotation of the cam follower.

In a second preferred embodiment, the cam is carried by the pivotal arm, and that the cam follower is mounted in the rear handle of the saw to be movable in a direction substantially parallel to that of the arm, the cam follower having a sloping cam follower surface portion which has a distant end and a near end in relation to the pivotal axis of the throttle trigger arm, so that on pushing in the throttle trigger button, the distance from said near end to the pivotal axis of the throttle trigger arm is gradually increased, the cam follower being secured to said one end of the force transmitting member so as to be displaced substantially along the throttle trigger arm by the pivotal movement of throttle trigger member.

Then, it is suitable that the cam has a cam surface shaped as a part of a cylinder having a center identical with a pivotal axis of the throttle trigger arm, whereby on further pushing in of the throttle trigger button, the cam follower rests against the cam surface without pulling the force transmitting member harder.

In a third preferred embodiment, that the cam is fixed in the rear handle of the saw and has a first cam surface portion, which has a near end and a far end in relation to a pivotal axis of the throttle trigger arm, and a second cam surface portion located at a constant distance from the pivotal axis, the cam follower being secured to said one end of the force transmitting member and mounted to follow the pivotal movement of the throttle trigger arm while moving axially therealong.

Then, it is suitable that the cam has a cam surface shaped as a part of a cylinder having a center identical with a pivotal axis of the throttle trigger arm, whereby on further pushing in of the throttle trigger button, the cam follower nose rests against the cam surface without pulling the force transmitting member harder.

To facilitate the achievement of the distinct operating positions, it is recommendable that the first cam surface portion is comparatively short while the second cam surface portion is comparatively long.

In another preferred embodiment of the invention, the force transmitting member is connected to a disc brake assembly comprising a brake disc mounted to rotate with the saw chain, a caliper carrying brake pads, a caliper support, in which the caliper is movable towards and away from the brake disc, and a compression spring supported between the caliper support and the caliper for pressing the brake pads against the brake disc, the brake pads constituting the first brake member and the brake disc constituting the cooperating rotary second brake member.

Then, it is also preferred that the brake pads form an acute angle, or V-shape, with each other, and the brake disc has a correspondingly tapered peripheral portion, and that the caliper has a body carrying a slightly pivotal head, on which the pads are mounted. A big advantage with the V-shape is that the brake force will be considerably increased. This enables the use of (and operation of) a considerably weaker compression spring. This disc brake assembly could also be used together with a conventional throttle trigger force transmitting arrangement.

Further, it is an object of the invention to provide a brake arrangement comprising a coasting brake and kickback brake which is less likely to suffer to an impaired kickback brake. Another object of the invention is to simplify the brake arrangement of a power tool while considering present and expected safety regulations.

At least one of the above mentioned objects are achieved and/or problems are met by providing a chainsaw having a brake arrangement comprising:

- a saw chain wound around a guide bar, where said guide bar is an extension from a housing;
- a drive means for providing a rotary drive force to a drive sprocket around which said saw chain is wound;
- a kickback brake drum arranged to rotate together with the drive sprocket and the saw chain;
- a kickback brake for quickly stopping the saw chain if at least one kickback actuator is actuated, the kick back brake including at least one kickback brake band extending around the kickback brake drum and means for tightening the kickback brake band around the kickback brake drum, and;
- a coasting brake weaker than the kickback brake being arranged to brake the saw chain unless a coasting actuator of the chainsaw is actuated;

wherein the coasting brake includes at least one coasting brake band extending around a coasting brake drum arranged to rotate together with the drive sprocket, and means for tightening the coasting brake band around the coasting brake drum wherein the at least one coasting brake band is either at least one longitudinally slit portion of the kickback brake band or at least one separate brake band. Thereby the kickback brake is likely not to be impaired by extensive use of the coasting brake.

Preferably, the means for tightening the kickback brake band includes:

- a toggle-link mechanism connected to at least one movable end of the at least one kickback brake band, which toggle-link mechanism has an interlocked normal position and a kickback position, a kick back spring biasing the toggle-link mechanism towards the kickback position, and;
- the at least one kick back actuator for releasing the interlock of the normal position enabling the kickback spring to push the toggle-link mechanism towards the kickback position thereby providing a pulling action on the at least one movable end of the kick back brake band tightening the kickback brake band around the kick back brake drum.

Preferably, the toggle-link mechanism includes a pivotal front link having a pivot, a non-pivotal rear link attached to the at least one movable end of the at least one kick back brake band, and an intermediate link pivotally attached to the front link and the rear link, the kickback spring biasing the rear link towards the pivot.

Preferably, said kick back actuator is operatively connected to the pivotal front link of the toggle-link mechanism.

Preferably, said kick back actuator is an externally accessible hand guard which is connected to the pivotal front link via a hand guard coupling.

Preferably, means for tightening the coasting brake includes a coasting spring for pulling at least one moveable end of the at least one coasting brake band when the coasting brake is active and thereby retarding the coasting brake drum.

Preferably, when actuating the coasting brake actuator the spring force of the coasting spring is counteracted, releasing the coasting brake.

Preferably, the rear link has a front member and a rear member, said front member being attached to the at least one movable end of the at least one coasting brake band, said rear member being pivotally attached to said intermediary link, and the two members being telescopically movable in relation to each other.

Preferably, the at least one movable end of the at least one kickback brake band is attached to the rear member.

Preferably, the coasting brake actuator is an externally accessibly tool operating mechanism connected to the coasting brake through a force transmitting member, said coasting brake being active unless said tool operating mechanism is actuated whereby upon actuation of tool operating mechanism counteracts the means for tightening the coasting brake releasing the coasting brake.

Preferably, the force transmitting member is a cable member of a Bowden cable and has a front end firmly anchored in a rear end of the front member of the rear link.

Preferably, said tool operating mechanism includes a throttle trigger and/or a throttle trigger lock for locking the throttle trigger against inadvertent throttling of the engine, and where actuating the throttle trigger and/or the throttle trigger lock, releases the coasting brake.

Preferably, the coasting spring and the kickback spring are helical compression springs.

Preferably, the coasting spring is of smaller diameter than the kickback spring and is located inside thereof.

Preferably, the said brake arrangement comprising a kickback brake and a coasting brake is mainly housed in a detachable clutch cover.

Preferably, the kickback brake drum is a clutch drum of a centrifugal clutch of the chainsaw and preferably, the kickback brake drum and the coasting brake drum are the same. Thereby only one brake drum is needed.

Alternatively, the coasting brake band is arranged beneath the kickback brake band with the coasting brake band located in a guiding channel formed in the kickback brake band. Alternatively the kickback brake band is arranged beneath the coasting brake band with the kickback brake band located in a guiding channel formed in the coasting brake band. Thereby the band in the channel is kept in place.

Alternatively, the coasting brake band is a longitudinally slit portion of the kickback brake band providing a brake band which has a common first end that divides into two longitudinally slit portions having one opposite end respectively, and wherein the a first of the opposite ends is secured to a stationary part in the engine housing and where means for tightening the kickback brake band around the brake drum is arranged to operate on the common first end, and where means for tightening the coasting brake band around the brake drum is arranged to operate on a second of the opposite ends.

Alternatively, the coasting brake band is a longitudinally slit portion of the kickback brake band providing a brake band which has common first end that divides into two longitudinally slit portions having one opposite end respectively, and wherein a first one of the opposite ends is secured to a stationary part in the engine housing and where means for tightening the kickback brake band around the brake drum is arranged to operate on a second of the opposite ends, and where means for tightening the coasting brake band around the brake drum is arranged to operate on the common first end.

According to another aspect of the invention it is proposed a chainsaw having a brake arrangement comprising:

a saw chain wound around a guide bar, where said guide bar is an extension from a housing;

a drive means for providing a rotary drive force to a drive sprocket around which said saw chain is wound;

a kickback brake for quickly stopping the saw chain if at least one kickback actuator is actuated, a coasting brake weaker than the kickback brake being arranged to brake the saw chain unless a coasting actuator of the chainsaw is actuated;

wherein the kickback brake and the coasting brake are arranged on one lateral side of the drive sprocket respectively. Thereby the brakes can operate without risk of interfering with one another.

Preferably, in a chainsaw with outboard-clutch including a clutch drum outboard the drive sprocket, the kickback brake is arranged to brake on the clutch drum and the coasting brake is arranged to brake on a coasting brake drum inboard the drive sprocket. Thereby any wires to the coasting brake do not need to enter a detachable clutch cover for the outboard clutch.

Preferably, the kick back brake includes at least one kickback brake band freely wound around a kickback brake drum arranged to rotate together with the drive sprocket and means for tightening the kickback brake band around the kickback brake drum. Preferably, the coasting brake includes at least one coasting brake band freely wound around a coasting brake drum arranged to rotate together with the drive sprocket, and means for tightening the coasting brake band around the coasting brake drum.

Alternatively, the coasting brake drum is an inner drum arranged to rotate together with the drive sprocket, and where the coasting brake includes at least one coasting brake band, and means for expanding the coasting brake band to brake against the inner brake drum.

Preferably, the coasting brake drum is a part of a drive wheel arranged to drive an oil pump for lubricating the saw chain.

When using separate brake bands for the coasting brake and the kick back brake, respectively, it is preferred to use one coasting brake band for the coasting brake and one kickback brake band for the kickback brake, i.e. a total of two brake bands. Thereby the width of the chainsaw is kept lower than if more brake bands were to be used.

Preferably, when the coasting brake band is a longitudinally slit portion of the kickback brake band, the kickback brake band is longitudinally slit into two portions, one portion for the kickback brake and one portion for the coasting brake.

BRIEF DESCRIPTION OF THE DRAWINGS

In the following, the invention will be described in more detail with reference to preferred embodiments and the appended drawings.

DETAILED DESCRIPTION OF THE PREFERRED EMBODIMENTS

A first part of the following description will be used for describing a chain saw brake arrangement, i.e. various brake members and their cooperation, and then a description of the coasting brake of the present invention, i.e. more precisely the means used for activating and deactivating the coasting brake members, will follow.

Figure 1:
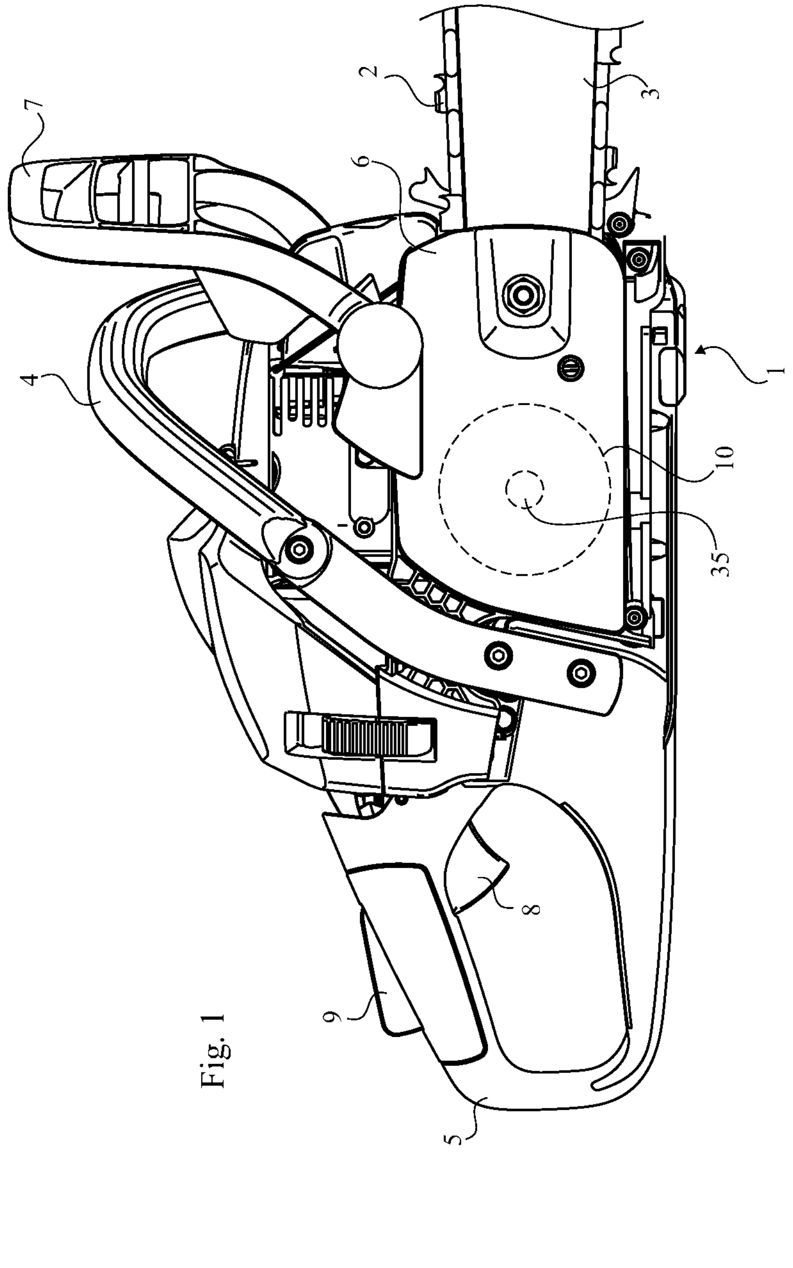
FIG. 1 is a side view of an engine driven chain saw having a clutch cover.
Figure 12:
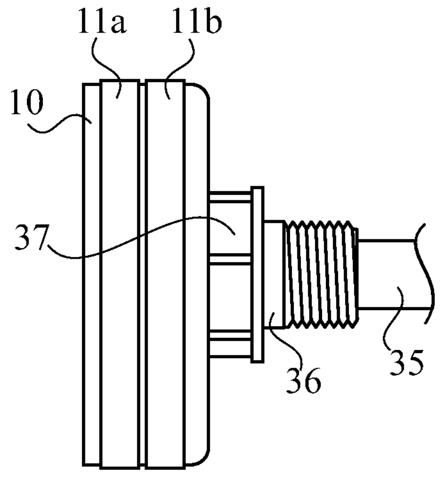
FIG. 12 is a detail of a chainsaw with outboard clutch having a wider clutch drum enabling two brake bands or a longitudinally slit brake band to be wound around it.

FIG. 1 is a side view of a chain saw, driven by a two-stroke engine, not shown. The chain saw has an engine housing 1, a saw chain 2, a saw chain guide bar 3, a front handle 4 for carrying the saw, a rear handle 5 for operating the saw, a detachable clutch cover 6 of the engine housing 1, and a hand guard 7 connected to a brake arrangement located inside of the clutch cover for rapidly stopping the rotation of the saw chain in case of a kickback of the saw. Thus the hand guard 7 acts as a kickback actuator for engaging the kickback brake. A saw operating mechanism requiring a grip of at least one hand of an operator is provided in the rear handle and is in the shape of a throttle trigger 8 and a throttle trigger lock 9. The throttle trigger lock has to be pressed down to permit the throttle trigger to move, thereby preventing an inadvertent throttling of the engine. Behind the clutch cover, a brake drum 10, shown in broken lines, is rotatably mounted on the engine housing. The brake drum 10 is the outer drum of a centrifugal clutch, i.e. the outside of the drum is used for braking, while the inside is affected by the engine's centrifugal clutch, not shown, and the drum is operatively connected to a drive sprocket, see for example FIG. 12, for driving the saw chain. Also shown in broken lines is the crankshaft 35 which drives the saw chain via the centrifugal clutch 10.

Figure 2:
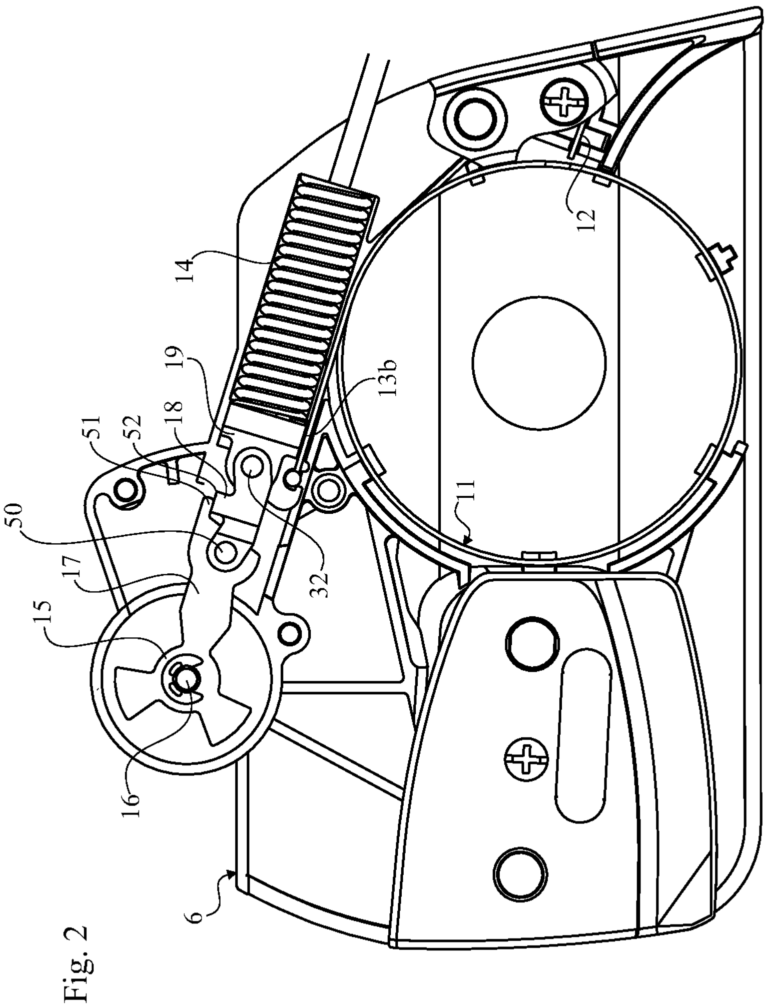
FIG. 2 is a side view of the inside of a clutch cover of the saw of FIG. 1 and housing a preferred embodiment of the brake arrangement of the invention including a kickback brake and a coasting brake.
Figure 3:
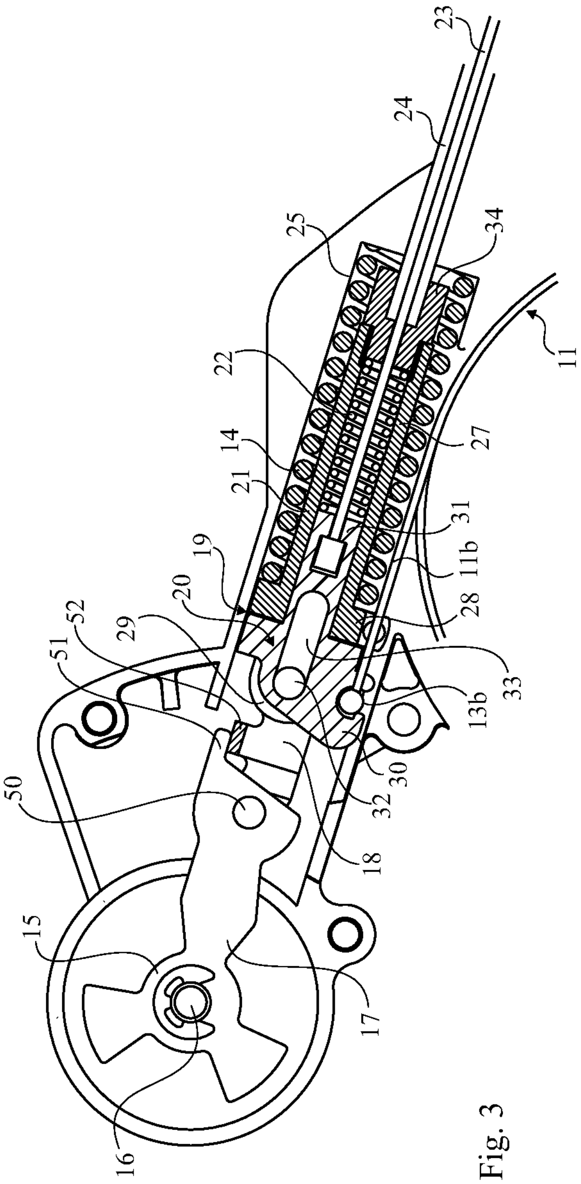
FIG. 3 is a cross-sectioned detail of FIG. 2 on a larger scale during normal operation of the chain saw, with both the kickback brake and the coasting brake inactive.
Figure 4:
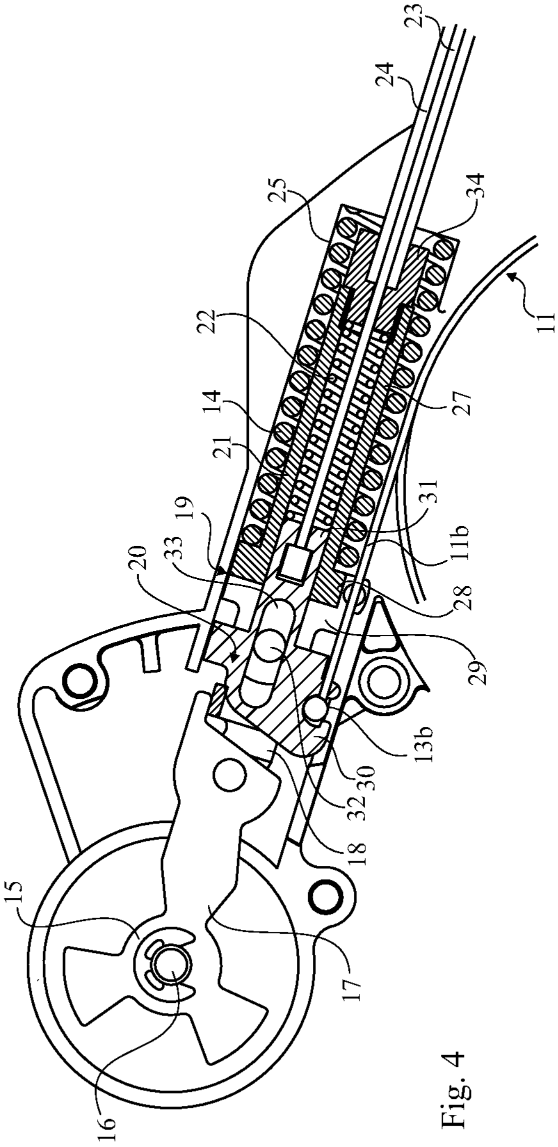
FIG. 4 is a cross-sectioned detail of FIG. 2 on a larger scale, but with the coasting brake active to tighten the brake band around the brake drum.
Figure 5:
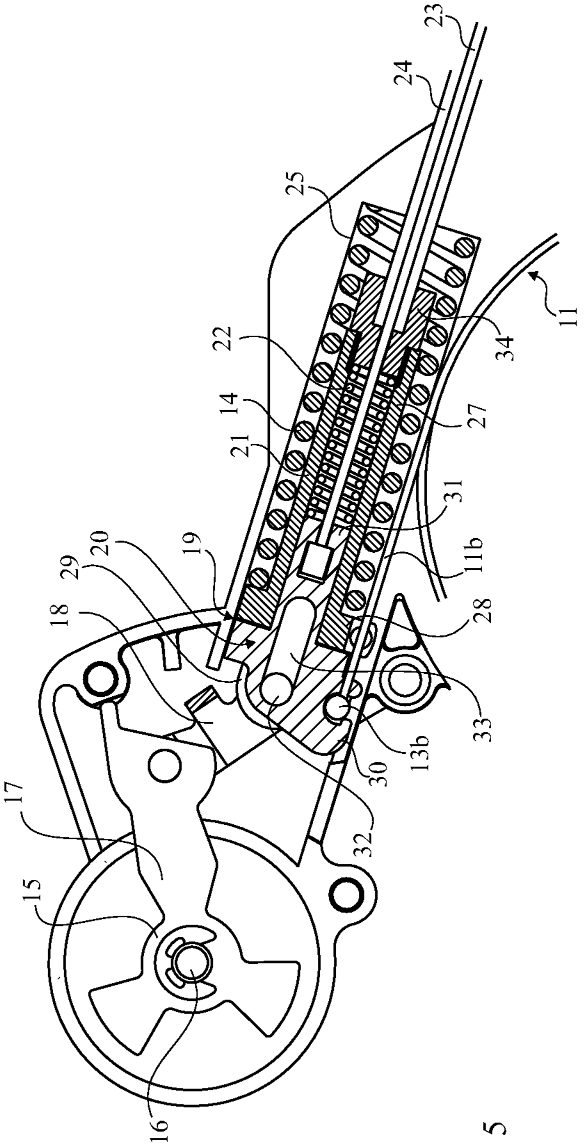
FIG. 5 is a cross-sectioned detail of FIG. 2 on a larger scale, but with the toggle-link mechanism snapped to a kick back position to release the kickback spring, so that kickback brake becomes active and tightens the brake band around the brake drum.
Figure 6:
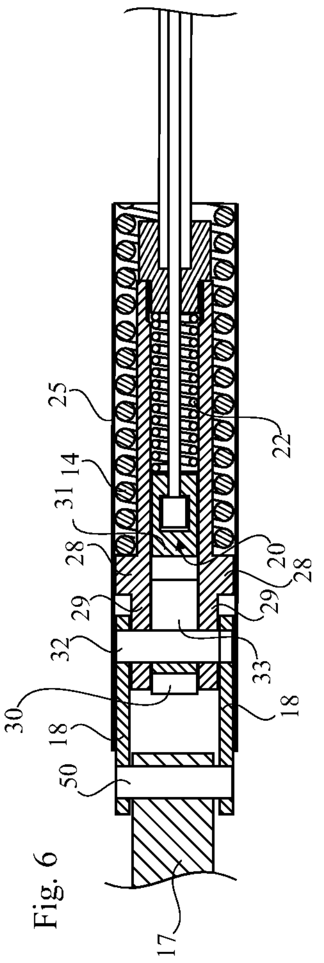
FIG. 6 is a simplified cross-sectioned top view of FIG. 2.
Figure 7:
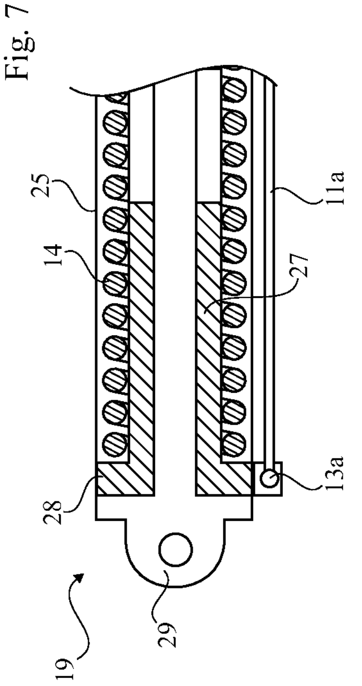
FIG. 7 is a simplified cross-sectioned side view of a rear member and kickback spring of FIGS. 2-6.
Figure 8:
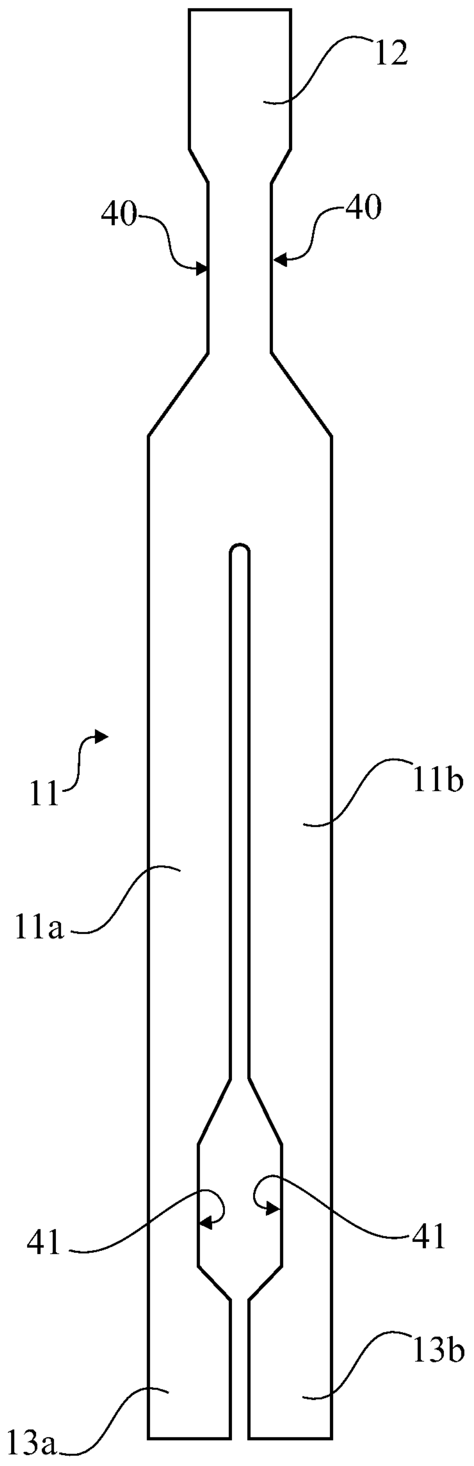
FIG. 8 shows a longitudinally slit brake band according to a first embodiment.

FIG. 2 is a side view of the inner side of the clutch cover 6 and the components mounted on, in or otherwise associated with the clutch cover. As FIG. 2 shows the inner side of the clutch cover, right hand side and left hand side are reversed in comparison to FIG. 1. FIGS. 3-5 are details of FIG. 2 shown on a larger scale and illustrating various stages of the braking arrangement during operation of the chain saw. Thus, in FIGS. 2-5 the front end of the saw is on the left hand side, and the rear end is on the right hand side. FIG. 6 is a simplified cross sectioned top view of FIG. 2. FIG. 7 shows a simplified cross-section of rear member of FIGS. 2-5. FIG. 8 shows a longitudinally slit brake band suitable to be used with the brake arrangement of FIGS. 2-7.

Figure 16:
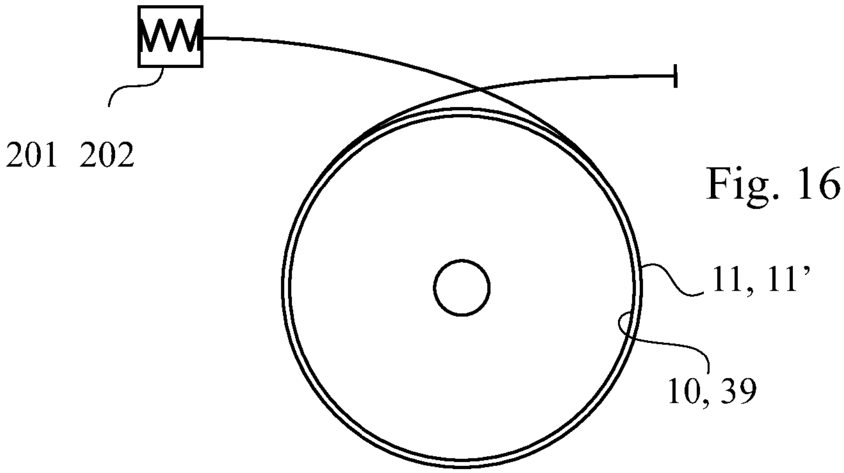

The brake arrangement shown in FIG. 2 comprises a kick-back brake mainly housed in said clutch cover 6 and including a brake band 11 extending around the brake drum 10 and having a fixed first end 12 attached to the clutch cover 6 and a moveable end 13*a*, 13*b*, and a kickback spring 14 for rapidly exerting a pulling action on the movable end 13*a*, 13*b* to rapidly tighten the brake band 11 around the drum in case of a kickback action of the handheld power tool, and a hand guard coupling 15 connected to the hand guard 7 for activating said brake. As seen in FIG. 8, the brake band 11 is longitudinally slit into two band portions; a first band portion 11*a* providing a first moveable end 13*a*, and a second band portion 11*b* providing a second moveable end 13*b*. The brake band comprises cooperating recesses 41, 40 enabling the brake band to overlap in a manner as shown in FIG. 16 when wound around the brake drum 10. Via coupling 15, the hand guard 7 is pivotally attached to the engine housing 1 and is operatively connected to a pivotal front link 17 of a toggle-link mechanism 17-19 housed in the clutch cover 6. The front link 17 and the hand guard 7 have a common pivot 16. The toggle-link mechanism 17-19 further includes a non-pivotal rear link 19 attached to the movable ends 13*a*, 13*b* of the brake band 11, and an intermediate link 18 pivotally attached to the front link 17, via a second pivot pin 50, and the rear link 19, via a first pivot pin 32. The kickback spring 14 biases the rear link 19 towards the pivot 16. During normal operating conditions, the toggle-link mechanism 17-19 has an interlocked normal position, i.e. a position, with the links forming a substantially straight line, but where the second pivot pin 50 is arranged to be slightly beneath a straight line drawn through the common pivot 16 and the first pivot 32. Thus, in normal interlocked position, as the kickback spring 14 biases the rear link towards the pivot 16, the front link 17 will be biased in clockwise direction. The mechanism can be snapped into a second position, i.e. a kick back position, forming a zigzag line, where the second pivot pin 50 comes above the straight line between the common pivot 16 and the first pivot 32, i.e. biasing the front link 17 in anticlockwise direction. In the shown embodiment, the links are provided with cooperating stops 51, 52 that prevent the links from appreciably deviating from the substantially straight line in a direction opposed to the direction of the snapping movement. The rear link 19 has a front member 20 and a rear member 21. The front member 20 is attached to the second movable end 13*b* of the brake band, the rear member 21 is attached to the first movable end 13*a* of the brake band and is pivotally attached to the intermediary link 18, and the two members 20, 21 are telescopically movable in relation to each other. Further, the brake arrangement comprises a coasting brake having a coasting spring 22 for biasing the second portion 11*b* of the brake band 11, said coasting spring being less strong than the kickback spring, and a force transmitting member 23 operatively connecting the tool operating mechanism 8, 9 to said front member 20. The coasting spring 22 urges the front member 20 towards the pivot 16, and the kickback spring 14 during normal running conditions of the power tool urges the rear member 21 against said intermediate link 18, but upon actuation of the kick back brake, the kickback spring 14 urges the rear member 21 against the front member 20 to rapidly tighten both portions 11*a*, 11*b* of the brake band 11 around the drum.

Further, FIGS. 3-7 show that the clutch cover 6 has a longitudinal cavity 25, which extends in the direction of the toggle-link mechanism 17-19. The cavity is substantially tangential to a recess 26 for the brake drum and is connected thereto by an outlet for the movable ends 13*a*, 13*b* of the brake band 11, so that the movable ends 13*a*, 13*b* of the brake band is located in the cavity 25. The coasting spring 22 and the kickback spring 14 are helical compression springs. The force transmitting member is a cable member 23 of a Bowden cable 24, and like in all conventional Bowden cables, the cable member 23 is axially displaceable relative to a hollow outer cable housing, the ends of which are prevented from moving by adjacent structure. The cable member 23 has a front end firmly anchored in a rear end of the front member 20 of the rear link 19. The other end of the cable member 23 is firmly anchored to the tool operating mechanism, preferably to the throttle trigger lock 9 thereof, but of course it could alternatively be connected to the throttle trigger 8. The firm anchoring of the cable member at both ends suitably is of the same type as in bicycle handbrakes. The rear link 19 and the helical compression springs 14, 22 are housed in the cavity 25, and a rear end of the cavity provides axial support for a rear end of the kickback spring 14. The sides of the cavity 25 and provides support laterally outwards for the kickback spring 14.

The rear member 21 of the rear link 19 includes a tube 27 having a front end and a rear end and provides support laterally inwards for the kickback spring 14. The rear end of the tube 27 is closed to provide axial support for the rear end of the coasting helical compression spring 22. In the shown embodiment, a holder 34 for the hollow outer cable housing of the Bowden cable 24 is screwed into the rear end of the tube 27 and closes the tube end. The front end of the tube 27 has a flange 28 to provide axial support for the front end of the kickback helical compression spring 22. The first moveable end 13*a* is firmly attached to a protruding part of the flange 28 at one side portion thereof. The flange 28 is laterally supported by the sides of the cavity 25 and it has a front side and a stud 29 projecting axially therefrom to the intermediate link 18, to which it is pivotally attached. The front member 20 of the rear link 19 includes a head 30 surrounded by the stud 29 and a piston rod 31 projecting into the tube 27. The second movable end 13*b* of the second portion 11*b* of the brake band 11 is firmly attached to a protruding part of the head 30. A rear end of the piston rod 31 provides axial support for the coasting spring 22, while the inner wall of the tube 27 provides support laterally outwards for the coasting spring 22. The cable member 23 of the Bowden cable 24 extends through an opening provided in the cable housing holder 34 at the rear end of the tube 27 and is firmly anchored in the piston rod 31. The first pivot pin 32 joins the stud 29 to the intermediary link 18 and extends into longitudinal slots 33 provided in said head 30 for permitting a limited sliding movement of the front member 20 of the rear link 19 on the rear member 21.

FIGS. 3-5 clearly illustrate the operation of the brake arrangement. FIG. 4 shows the brake arrangement at the start of the engine. The coasting brake is active and tightens the brake band around the brake drum, so that the saw chain is immobilized even when, to facilitate starting, the engine is set to have a high idling speed during the very start. Since the person starting the saw has not yet gripped around the rear handle of the saw, there is no tension in the cable member 23 of the Bowden cable 24. Consequently, the coasting compression spring 22 by pushing the rear end of the piston rod 31 is expanded and has displaced the front member 20 of the rear link 19 axially toward the common pivot 16 for the hand guard coupling 15 and the first link 17 of the toggle-link mechanism in a telescopic manner relative its rear member 21 so as to tighten the second portion 11*b* of the brake band 11 around the drum. Since the toggle-link mechanism 17-19 has not been snapped out from its interlocked, substantially rectilinear position, the flange 28 of the tube 27 in the rear member 21 of the rear link 19 maintains the kickback compression spring 14 compressed, and a gap is formed between the head 30 of the front member 20 and the flange 28. Consequently the first moveable end 13*a* of the brake band is not affected and thus the first portion 11*a* of the brake band 11 remains loose around the brake drum. Simultaneously, a gap of about the same size is opened between the first pivot pin 32 and a front end of the slot 33. When the engine has started and is running, the operator grips around the rear handle of the saw to release the throttle trigger lock 9 and throttle the engine, so that the high idling speed setting is released and the engine starts idling at a normal low speed. This grip around the rear handle and the ensuing release of the throttle trigger lock 9 tensions the cable member 23, so that the coasting spring 22 will be compressed, the front member 20 will be retracted to contact the rear member 21, and the second portion 11*b* of the brake band 11 will loosen its grip around the brake drum and form a gap on the order of about 1 mm to the drum. A reasonable time for the coasting brake to stop the rotation of the saw chain 2 may be on the order of two seconds, but by selecting the strength of the coasting spring 22, it is easy to set the desired time it will take for the coasting brake to stop the rotation.

This condition, which is the normal operating condition, is shown in FIG. 3. If the user of the saw for some reason will let his grip around the rear handle go, the throttle trigger lock 9 will immediately release the cable member 23, and the coasting spring 22 will tighten the second portion 11*b* of the brake band around the drum as described above.

If the kickback brake is released, you get the situation shown in FIG. 5. Here, the hand guard 7 through coupling 15 or inertia has caused the toggle-link mechanism 17-19 to snap out from its interlocked, substantially rectilinear position, and the kickback spring 14 has expanded, and the gap between the head 30 of the front member 20 and the flange 28 is closed, and the gap between the first pivot pin 32 and a front end of the slot 33 is reduced to a minimum or even closed. Consequently, the kickback spring 14 presses the flange 28 of the rear member 21 against the head 30 of the front member 20 and, thus, the entire rear link 19 toward the common pivot 16 for the hand guard coupling 15 and the first link 17, thereby tightening both portions 11*a*, 11*b* of the brake band 11 rapidly and forcefully around the brake drum. The kickback spring is strong enough to stop the movement of the saw chain at full speed within at most 120 milliseconds as an average value. As can be seen in FIG. 5, the coasting spring 22 is not affected by the activation of the kickback brake but remains compressed.

The coasting brake will reduce the risk of using and especially of starting an engine-driven chain saw, as the saw chain 2 does not rotate during start. As soon as the user of the saw with the engine operating releases his grip around the rear handle 5 of the saw, the saw chain 2 will stop rotating, and this provides a transportation brake for a saw with an engine at idling speed. Further, the invention is simple to apply to existing designs of similar basic type, since the kickback brake is comparatively unaffected and relatively few new components are added. This also gives the advantage of a compact construction, in that the cable member 23 or similar force transmitting member and the coasting spring 22 are located in the center of the kickback spring 14. In addition, the wear due to the coasting brake will only affect the second band portion 11*b*, consequently the first band portion 11*a* is unaffected by the coasting brake and thus in fresh condition in case of a kickback.

Figure 15:
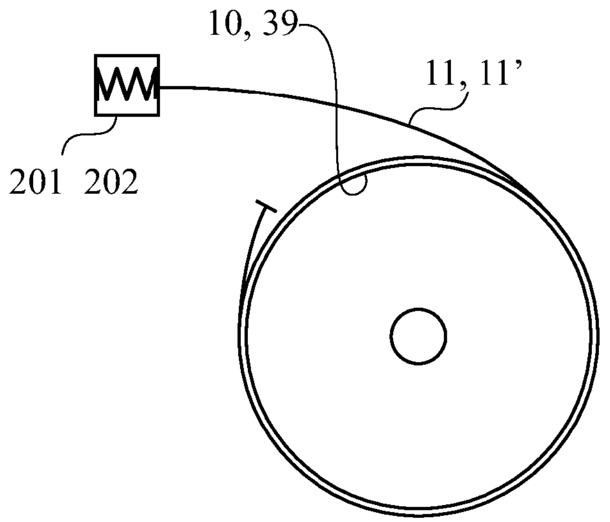
FIGS. 15-17 are examples on how to arrange brake band(s) around the brake drum.
Figure 18:
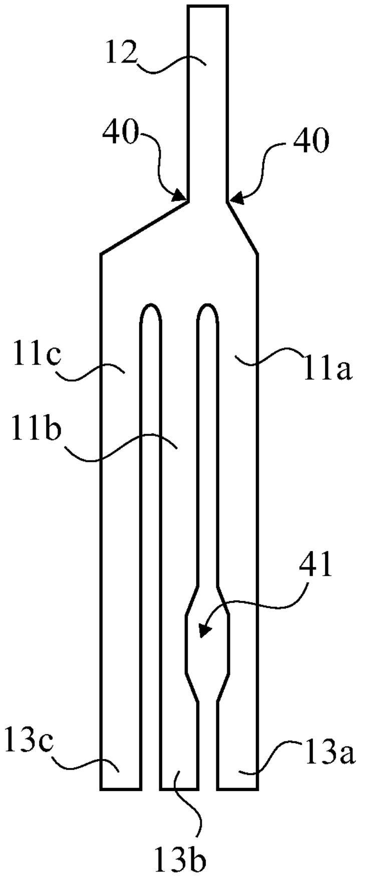
FIGS. 18-19 are examples of longitudinally slit brake bands.
Figure 19:
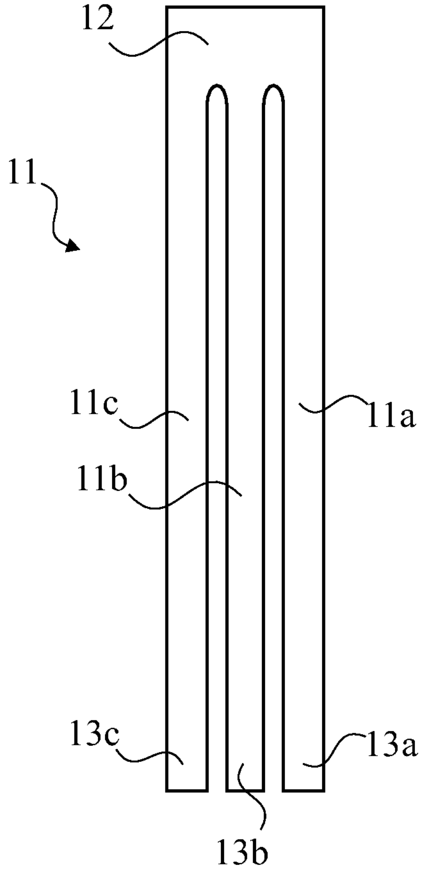

Even though we have exemplified with the brake band of FIG. 8, it is of course possible to use a brake band 11 slit into three longitudinal portions as shown in FIGS. 18 and 19, the intermediate portion 11*b* attached to the head 30 and the side portions 11*a*, 11*c* attached to the flange 28 at one side of the rear member 20 respectively. The example shown in FIG. 18 has cooperating recesses 40, 41 and can thus suitably be wound around the brake drum as of FIG. 16, while the example shown in FIG. 19 lacks cooperating recesses and can therefore not be arranged as in FIG. 16 but rather as shown in FIG. 15.

Figure 9:
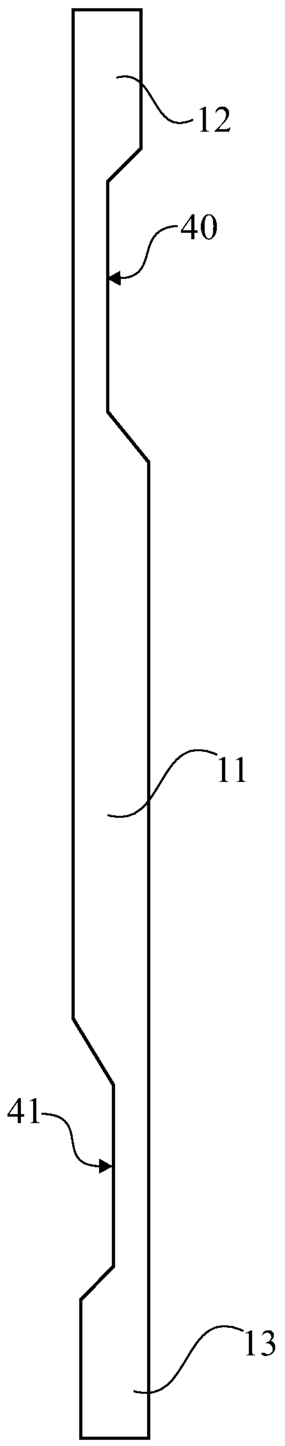
Fig. 9 [Prior Art]
FIG. 9 shows a single brake band according to the prior art.

Instead of a slit band, it would of course also be possible to use two or three single and separate brake bands 11, for instance of the kind seen in FIG. 9, by arranging the single brake bands 11 side by side when wound around the brake drum 10. A first brake band 11 attached to the head 30 providing the coasting brake and second brake band 11' attached to the flange 28 providing the kickback brake. The cooperating recesses 40, 41 enable the brake band 11 of FIG. 9 to be wound around the brake drum 10 as of FIG. 16.

Figure 17:
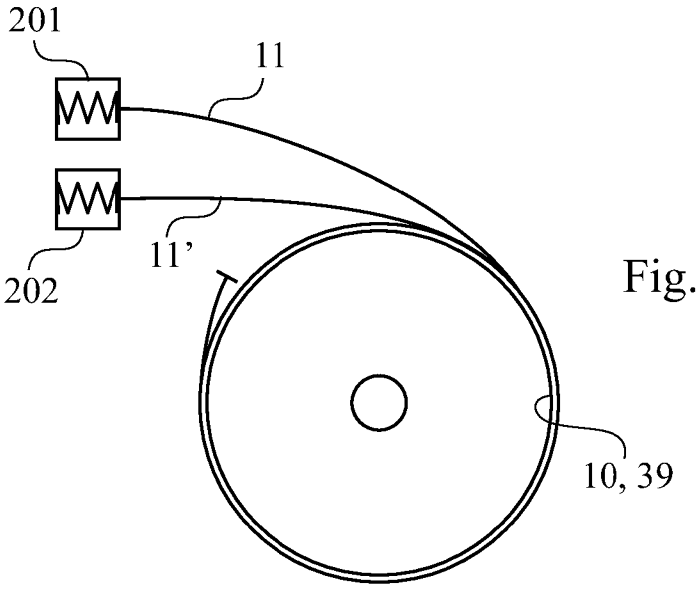
Figure 20:
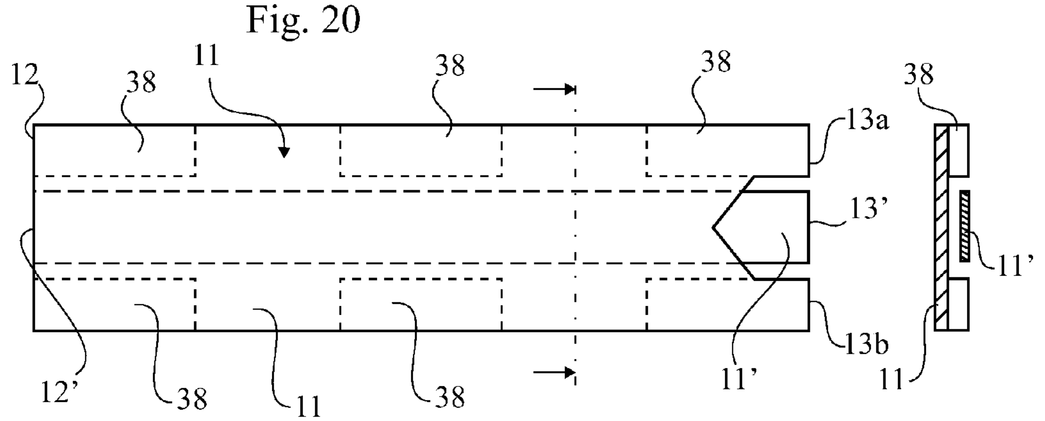
FIGS. 20-23 are examples of pair of brake bands, where a portion of a first of the brake bands overlaps a second of the brake bands.
Figure 21:
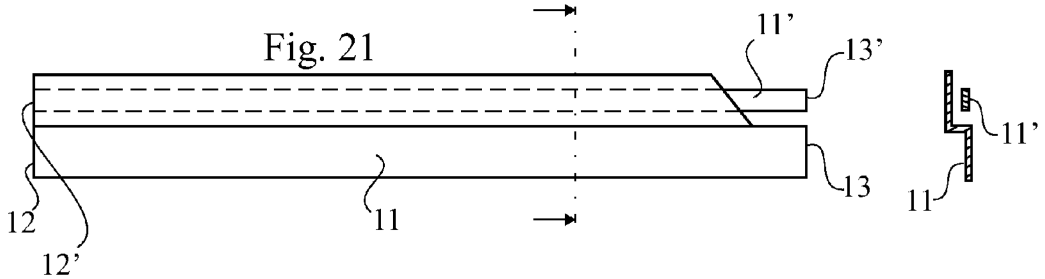
Figure 22:
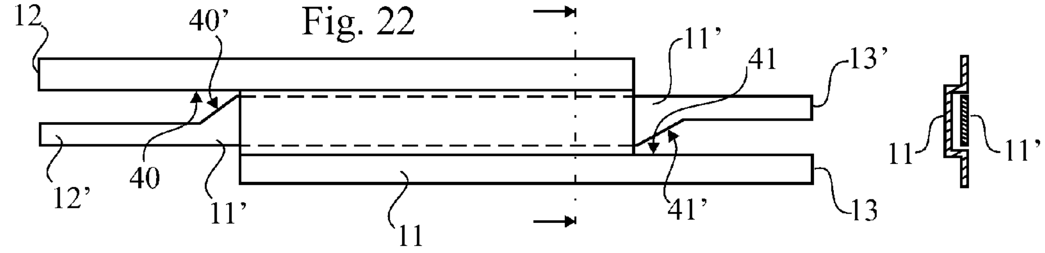
Figure 23:
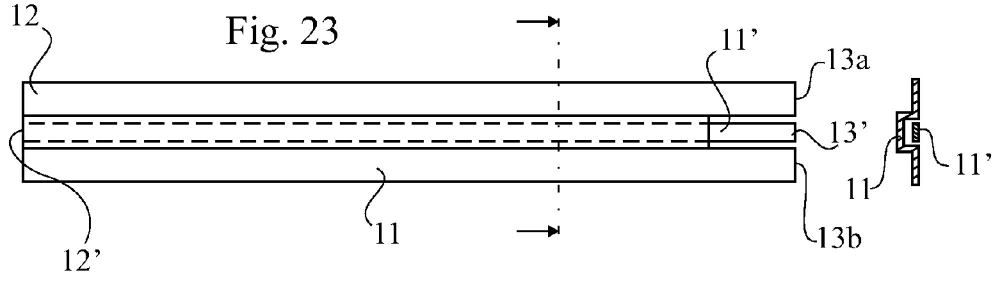

It would also be possible to use the examples on brake band pairs shown in FIGS. 20-23. The example shown in FIG. 20 shows a wide first brake band 11 having a number of wear surfaces 38, for contacting a brake drum, distributed along each longitudinal side of the brake band 11, forming a longitudinal channel at the centre of the first brake band 11, where a less wide second brake band 11' can run freely. The wear surfaces 38 also serve as guidance members for the second bake band 11' keeping it in place in the lateral direction. FIG. 21 shows a wide first brake band 11 having step-shaped cross-section with a first longitudinal portion leveled to contact a brake drum and a second longitudinal portion leveled above a second brake band 11', lying side by side with the first longitudinal portion. The stepwise cross-section enables the first brake band 11 to be comparably wide, whereby it can withstand higher pulling forces. FIG. 23 shows a wide first brake band 11 having step-shaped cross-section with a two longitudinal portions leveled to contact a brake drum at one side respectively of a centrally arranged second brake band 11'. The two parallel longitudinal portions are combined by a third longitudinal portion leveled above the central second brake band 11' forming a longitudinal channel at the centre of the first brake band where the less wide second brake band 11' can run freely. The two parallel longitudinal portions also serve as guidance members for the second bake band 11' keeping it in place in the lateral direction. The third longitudinal portion may be provided with evenly distributed slots/openings. The examples of FIGS. 20, 21, 23 lack cooperating recesses and can therefore not be arranged as in FIG. 16 but rather as shown in FIG. 15 or 17. FIG. 22 shows a brake band pair 11, 11' having the similar cross-section as that of FIG. 23. However, this embodiment the brake bands 11, 11' include cooperating recesses 40, 41 allowing them to be arranged as in FIG. 16.

Figure 11:
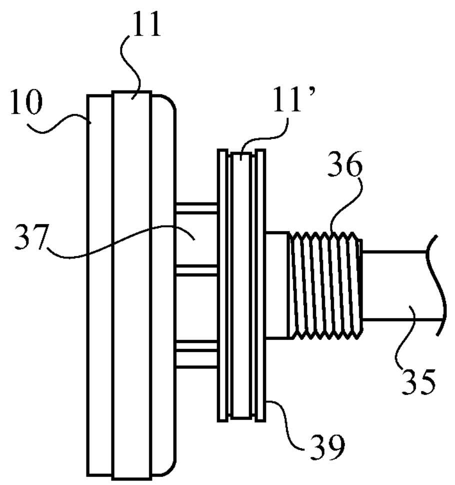
FIG. 11 is a detail of a chainsaw with outboard clutch having a first brake band wound around the clutch drum and a second brake band wound around a brake drum located inboard the saw chain.

FIG. 11 shows a brake arrangement of a chainsaw with an outboard clutch drum 10 according to a further embodiment. The crankshaft 35 drives a drive sprocket 37 for driving the saw chain, not shown, via a centrifugal clutch 10. The exterior of the drum of the centrifugal clutch provides a first brake drum 10 onto which a first brake band 11 of a kickback brake 201 is wound. The kickback brake preferably is of the kind shown in U.S. Pat. No. 6,842,987. However, other kickback brake arrangements are possible. A drive wheel 36, connected to the drive sprocket 37 in such manner as to rotate with the drive sprocket 37, is arranged to drive an oil pump, not shown, for lubricating the saw chain. The drive wheel 36 includes a second brake drum 39 onto which a second brake band 11' of a coasting brake 202 is wound. The coasting brake 202 preferably is of the kind shown in FIGS. 13 and 14. Thus in this embodiment the kickback brake 201 and the coasting brake 202 are separate brakes acting on separate brake drums 10, 39. Further, as can be seen, the two brake drums are located one on each side of the drive sprocket 37. In particular, it is an advantage to have the coasting brake 202 inboard the drive sprocket instead of having it located in the detachable clutch cover 6, since a) the coasting brake usually is connected by a wire to the throttle trigger 8 or the throttle trigger lock 9, wherefore the wire preferably should be disconnected when removing the clutch cover 6, and b) the coasting brake is active when the engine is turned off, in contrast to the kickback brake, wherefore the coasting brake must be released for removing the cover 6.

Figure 13:
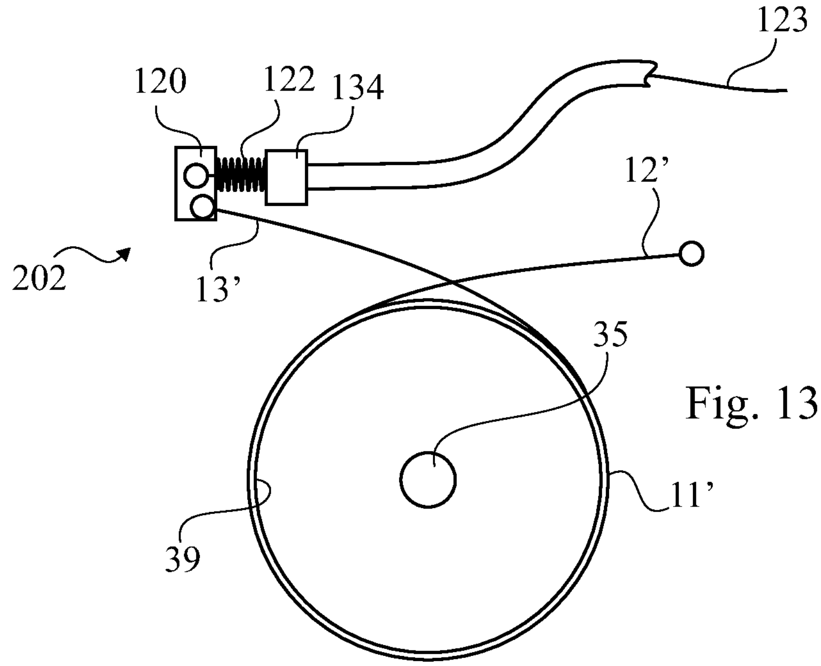
FIGS. 13-14 shows an embodiment of a separate coasting brake including a brake band wound around a brake drum.
Figure 14:
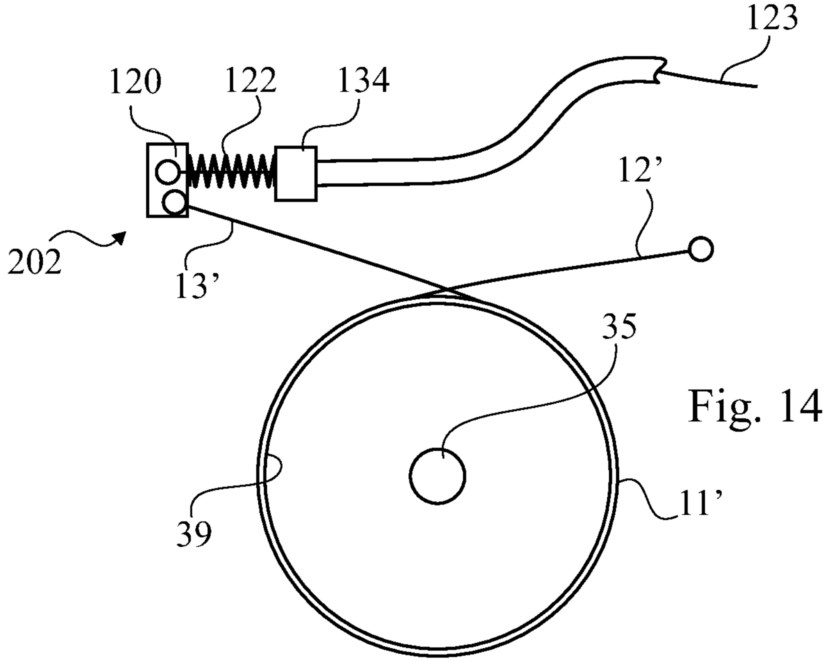

FIGS. 13 and 14 show an embodiment of a separate coasting brake 202 including a brake band 11' wound around a coasting brake drum 39. The brake band 11', preferably of the kind shown in FIG. 9, extends around the coasting brake drum 39 and has a fixed first end 12' firmly secured to a stationary part in the engine housing of the chainsaw and a moveable end 13' and a coasting spring 122 arranged between a stationary member 134 connected to the engine housing and a moveable member 120 having the moveable end secured thereto. The moveable member 120 arranged so that it can move slidingly along a straight line urging the moveable end 113 in a direction corresponding to a tightening of the coasting brake band 11' around the coasting brake drum 39. A force transmitting member 123, preferably in the form of a Bowden cable, operatively connects the tool operating mechanism, i.e. the throttle trigger or throttle trigger lock, to the moveable member 120. Pulling the force transmitting member 123 counteracts the spring force of the coasting spring 122 thereby loosening the coasting brake band 11' around the brake drum 39, i.e. pushing the throttle trigger or the trigger lock releases the coasting brake. FIG. 14 shows the coasting brake actively braking and FIG. 13 non-activated. The coasting brake drum 39 can e.g. be the exterior of the drum of the centrifugal clutch 10 or the second brake drum 39 shown in FIG. 11. The coasting brake 202 of this kind can also be arranged on the same brake drum as a kickback brake, for instance the exterior of the drum of a centrifugal clutch 10, in which case the kickback brake and the coasting brake are arranged side by side, the kickback brake e.g. of the kind shown in U.S. Pat. No. 6,842,987. This coasting brake 202 is also suitable when having two separate brake drums 10, 39 as described in relation to FIG. 11.

FIGS. 15-17 show examples on how the brake bands 11, 11' can be wound around a brake drum 10, 39. The box 201, 202 in FIGS. 15 and 16 may represent an integrated braking arrangement with a coasting brake 202 integrated with the kickback brake 201 as shown e.g. in FIGS. 2-7 or as a single coasting brake 202 as of FIGS. 13 and 14, or a single kickback brake 202 as shown e.g. in U.S. Pat. No. 6,842,987. In FIG. 15, the brake bands 11, 11' are wound in such manner as not to overlap/cross each other and in FIG. 16 the brake bands 11, 11' are wound in such manner as to overlap/cross each other, preferably by using brake bands with cooperating recesses 40, 41. In FIG. 17, the brake bands 11, 11' are also wound in such manner as not to overlap/cross each other. The kickback brake 201 and the coasting brake 202 are here shown spatially separated while still on the same drum 10, 39.

In an alternative embodiment, the coasting brake band of FIG. 8, which has a common first end 12 that branches into two longitudinally slit portions 11*a*, 11*b* having an opposite end 13*a*, 13*b*, respectively, a first one 13*a* of the opposite ends 13*a*, 13*b* is secured to a stationary part in the engine housing 1, and means for tightening the kickback brake band around the brake drum, in the form of a kickback spring and a toggle link mechanism, is arranged to operate on a second one 13*b* of the opposite ends 13*a*, 13*b*, and means for tightening the coasting brake band around the brake drum, e.g. as of the mechanism of FIGS. 13 and 14, is arranged to operate on the common first end 12. Alternatively the coasting brake operates on the second 13*b* of the opposite ends 13*a*, 13*b*, while the kickback brake operates on the common first end 12.

Figure 10:
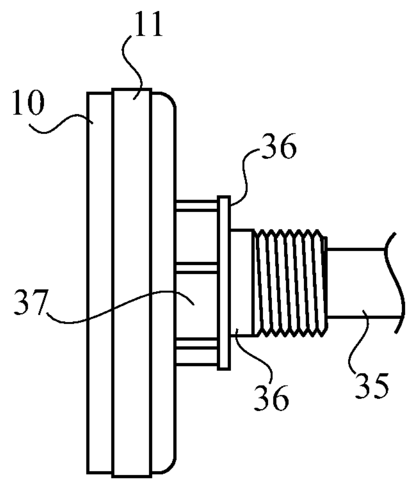
Fig. 10 [Prior Art]
FIG. 10 is a detail of a chainsaw with outboard clutch having a brake band wound around the clutch drum according to prior art.
Figure 24:
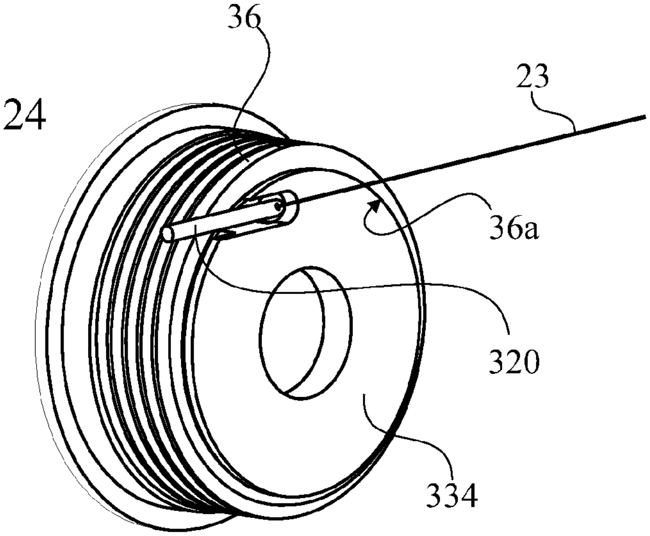
FIGS. 24-26 show an alternative embodiment of break members of a coasting brake.
Figure 25:
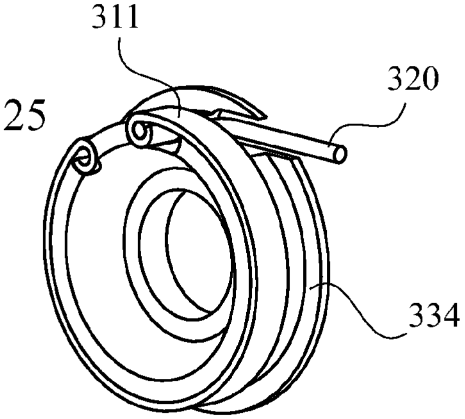
Figure 26:
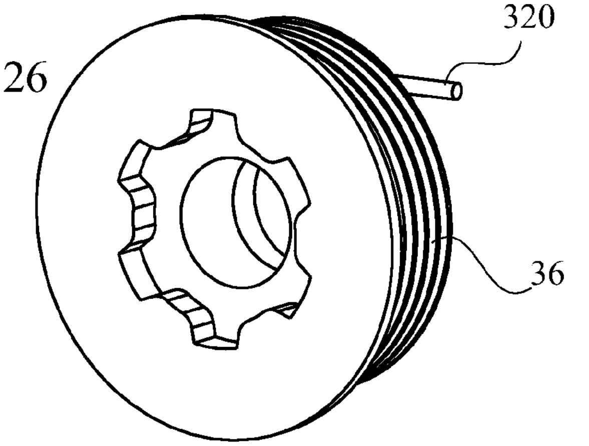

FIGS. 24-26 show an alternative embodiment of a coasting brake. A drive wheel 36, connected to the drive sprocket 37, e.g. as seen in FIG. 10, in such manner as to rotate with the drive sprocket 37, is arranged to drive an oil pump, not shown, for lubricating the saw chain. In this embodiment the drive wheel 36 comprises an inner drum 36*a*. A stationary holder 334 is arranged within inner drum 36*a*, and the stationary holder 334 is secured to the engine housing of the chainsaw. The stationary holder 334 supports an inner coasting brake band 311. The inner coasting brake band 311 is urged towards the inner drum 36*a* by a moveable member 320 which is spring loaded by a coasting spring, not shown. A force transmitting member 23 is operatively connected to the moveable member 320 in such manner as to counteract the spring force when actuated. The force transmitting member 23 is connected to the trigger lock 9 or the throttle trigger 8 of FIG. 1.

Figure 27:
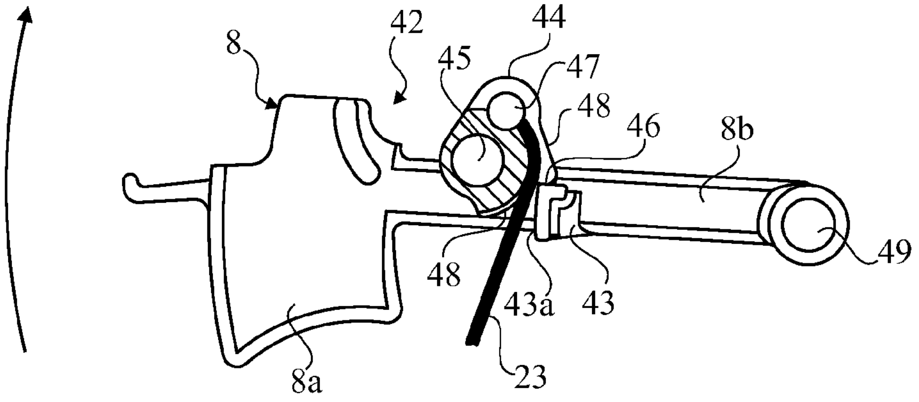
FIG. 27 is a side view partly in cross section of a first preferred embodiment of a mechanism, which gives distinct operating positions and adds only a low extra force to the normal function of the throttle trigger member, connecting the throttle trigger member to one end of a force transmitting member for moving a first brake member into and out of engagement with a second brake member that rotates when the chain is running, the mechanism being shown when the throttle trigger is released and coasting brake in braking position.

FIG. 27 is a side view partly in cross section of a first preferred embodiment of a mechanism 42 according to the present invention. The mechanism is intended to be used in a chain saw of the kind shown in FIGS. 1-26, for example, for providing a chainsaw coasting brake, including a saw chain speed controlling throttle trigger member 8 and a force transmitting member 23. The force transmitting member 23 preferably is the cable member of a Bowden cable, and it has one end operatively connected to the throttle trigger member 8 and the other end operatively connected to a first brake member 11, which is biased towards a cooperating rotary second brake member 10, e.g. a brake drum. The rotary second brake member 10 rotates when the saw chain 2 is running, so that the saw chain 2 is free to run when the throttle trigger member 8 is pushed in but braked when the throttle trigger member 8 is released to make the first brake member 11 press against the second brake member 10 and prevent the saw chain 2 from running. The mechanism 42 of FIG. 27 connects said one end of the force transmitting member 23 to the throttle trigger member 8 and is designed to restrict the movement of the force transmitting member 23 to an initial phase of the pushing in of the throttle trigger member 8.

Thereby, on pushing in the throttle trigger 8 farther after the first phase of the pushing in thereof has passed, the trigger finger of the saw user will not have to overcome an increasing biasing force from the coasting brake spring 22 (FIGS. 3-6), and the user of the saw will experience the mechanism 42 as having two distinct operating positions. When holding full throttle the user will only have to use appr. the same force as necessary for a power tool without a coasting brake. The use of a mechanism having distinct operating positions is therefore of vital importance to the quick braking of the saw chain speed to zero and will effectively contribute to the reduction of the braking period from two or a few seconds down to about one second or less. In addition, since only a low extra force is added by the mechanism 42, the normal function of the throttle trigger member 8 is not affected by increased friction.

The throttle trigger member 8 is mounted in the rear handle 5 of the saw and includes a throttle trigger button 8*a* and an arm 8*b* extending from the throttle trigger button in the direction of the rear handle 5. The arm 8*b* has a free end that is journalled in bearings 49 inside the rear handle 5 to permit pivotal movement of the throttle trigger button 8*a*. The mechanism 42 includes a cam 43 and a cam follower 44 that is operatively connected to said one end of the force transmitting member 23, The cam follower 44 rests on the cam 43 with the force transmitting member 23 slackened to keep the brake members 11, 10 firmly pressed against each other when the throttle trigger button 8*a* is released, but on pushing in the throttle trigger button, a relative movement between the cam 43 and the cam follower 44 causes the cam follower 44 to pull the force transmitting member 23 to separate the brake members 11, 10 from each other to release the saw chain 2 for rotation.

Figure 28:
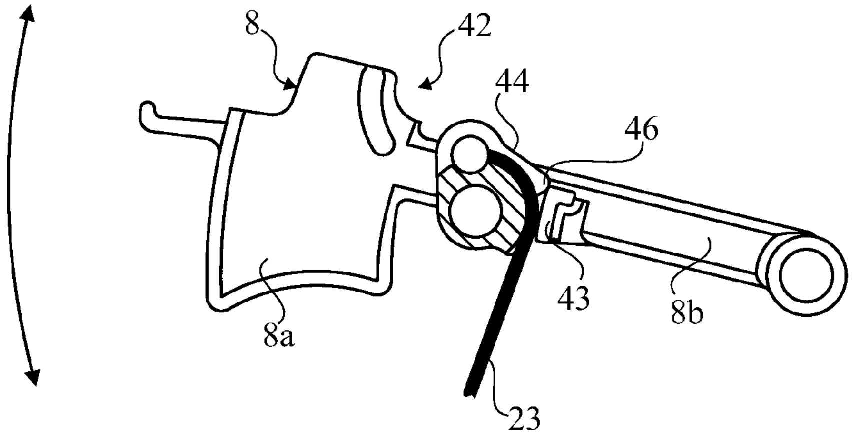
FIG. 28 is a side view showing the mechanism of FIG. 27 when the throttle trigger is in the beginning of the throttle position, but with no throttle, and with the coasting brake fully released.

In a first preferred embodiment of the mechanism 42 shown in FIG. 27, the cam 43 is carried by the pivotal arm 8*b*, the force transmitting member 23 is the cable member of a Bowden cable, and the mechanism 42 further includes a shaft member 45 carried internally in the rear handle 5 and located near the throttle trigger button 8*a*. The cam follower 44 is journalled on the shaft member 45, and has a nose 46 and a lock 47 for said one end of the cable member 23. As shown in FIG. 27, the cam follower nose 46 rests on the cam 43 when the throttle trigger button 8*a* is released, but on pushing in the throttle trigger button 8*a* slightly as shown in FIG. 28, the cam 43 lifts the cam follower nose 46 to rotate the cam follower 44 on the shaft member 45 and thereby pull the cable member 23 to separate the brake members 11, 10 from each other to release the saw chain 2 for rotation, but preferably, the throttle trigger 8 still does not throttle the engine or motor. On pushing in the throttle trigger button 8*a* from the position shown in FIG. 27 to that shown in FIG. 28, the force transmitting cable member 23 compresses the coasting brake spring 22 to such an extent that an additional pushing in of the throttle trigger button 8*a* to the position shown in FIG. 29 will not cause any further compression of the spring.

Figure 29:
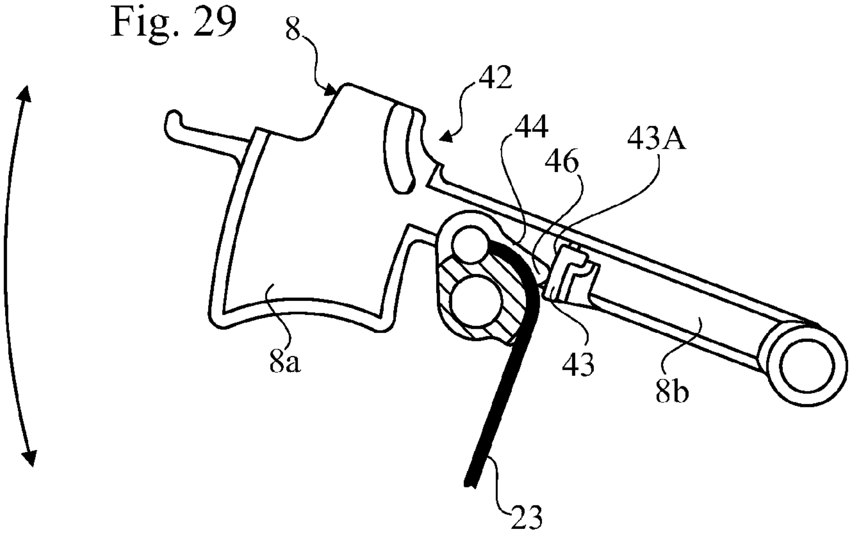
FIG. 29 is a side view showing the mechanism of FIG. 27 when the throttle trigger is in throttle position, with throttle, and with coasting brake released.

Further, the cam follower 44 with its nose 46 is provided with a groove 48 serving as a guide for the cable member 23 during the rotation of the cam follower 44. The bottom of the groove 48 suitably is located at a constant distance from the rotational axis of the cam follower 42. Preferably, the cam 43 has a cam surface 43*a* shaped as a part of a cylinder having a center identical with a pivotal axis of the throttle trigger arm 8*b*, whereby on further pushing in of the throttle trigger button 8*a* as shown in FIG. 29 to throttle the engine or motor fully, the cam follower nose 46 will rest against the cam surface 43*a* without rotating the cam follower 44 further. If desired, a rotary roller, not shown, may be provided at the tip of the cam follower nose 46 for reducing friction against the cam 43.

Figure 30:
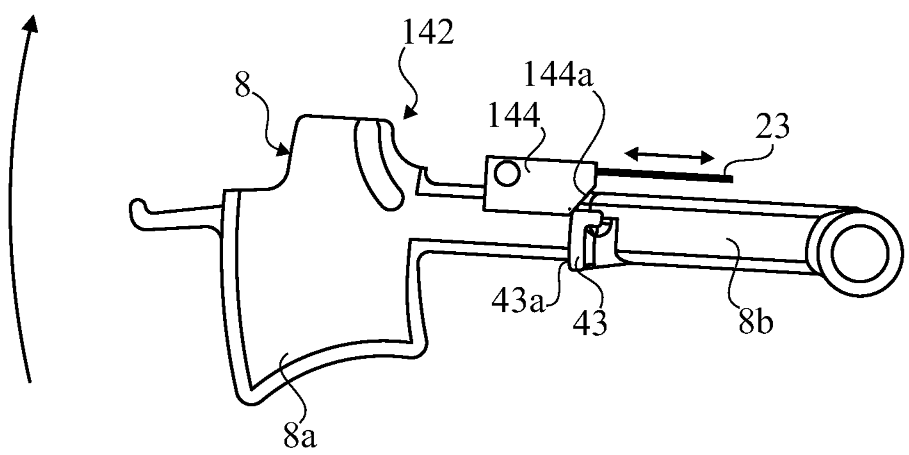
FIG. 30 is a side view similar to FIG. 27 showing a second preferred embodiment of the mechanism.

FIG. 30 shows a second preferred embodiment of the mechanism 142 of the present invention. It differs from the embodiment shown in FIGS. 27-29 in that the cam follower 144 instead of being rotary mounted is mounted to be linearly displaced in the rear handle 5 of the chain saw in a direction that is substantially parallel to that of the throttle trigger arm 8*b*. The cam follower 144 has a sloping cam follower surface portion 144*a*, which has a far end and a near end in relation to the pivotal axis of the throttle trigger arm 8*b*, so that on pushing in the throttle trigger button 8*a*, the distance from said near end to the pivotal axis of the throttle trigger arm 8*b* is gradually increased. The cam follower 144 is secured to said one end of the force transmitting member 23 so as to be displaced substantially along the throttle trigger arm 8*b* by the pivotal movement of throttle trigger member 8. On pushing in the throttle trigger button 8*a* from a starting position similar to that shown in FIG. 27, the cam follower 144 will be pressed toward the left hand side of FIG. 30, and when said near end of the sloping cam follower surface portion 144*a* arrives at the cam 43, the coasting brake spring 22 is compressed to such an extent that an additional pushing in of the throttle trigger button 8*a* will not cause any further compression of the spring 22.

Figure 31:
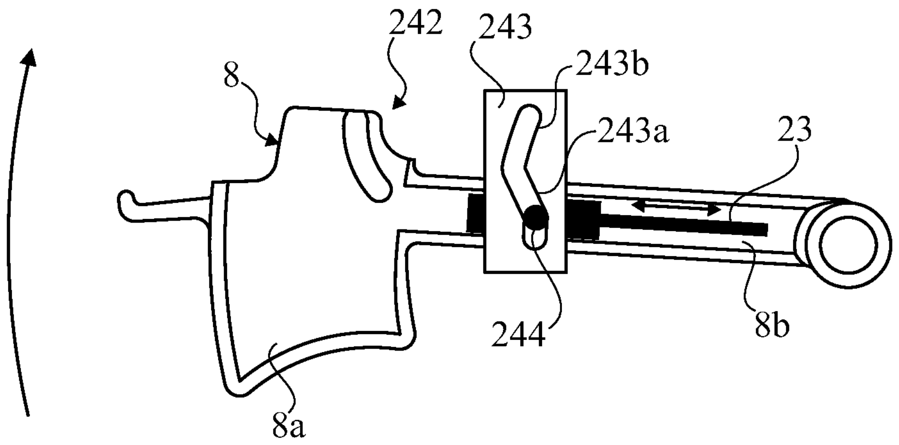
FIG. 31 is a side view similar to FIG. 27 showing a third preferred embodiment of the mechanism.

FIG. 31 shows a third preferred embodiment of the mechanism 242 of the present invention. In this embodiment, the cam follower 244 has the shape of a pin extending perpendicularly from said one end of the force transmitting member 23 that extends inside or along the throttle trigger arm 8*b* and is displaceable along the arm, and the cam 243 is fixed to the interior of the rear handle 5 of the saw instead of being fixed to the throttle trigger arm 8*b*. The cam 243 has a sloping cam surface portion 243*a*, which has a near end and a far end in relation to the pivotal axis of the throttle trigger arm 8*b*. At the far end, the cam surface changes direction and forms a cam surface portion 243*b* that is located at a constant distance from the pivotal axis of the throttle trigger arm 8*b*. In the shown embodiment, the cam surface is shown as a slot 243 in an appropriate structural member fixed in or formed in the interior of the rear handle 5 of the chain saw, and the pin-shaped cam follower 244 extends through the slot. On pushing in the throttle trigger button 8*a* from a starting position similar to that shown in FIG. 27, the pin-shaped cam follower 244 will be pressed toward the left hand side of FIG. 31, and when the cam follower 244 arrives at the far end of the sloping cam surface portion 243*a*, the coasting brake spring 22 will be compressed to such an extent that an additional pushing in of the throttle trigger button 8*a* will not cause any further compression of the spring 22.

Figure 32:
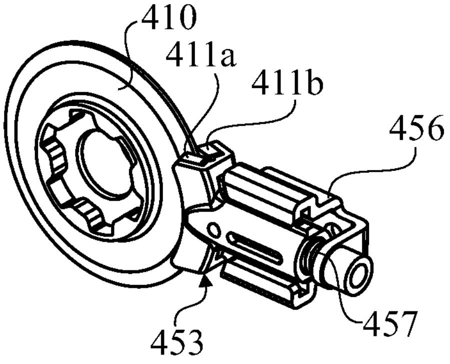
FIG. 32 is a perspective view of a disc brake assembly suitable for use as another alternative coasting brake.
Figure 33:
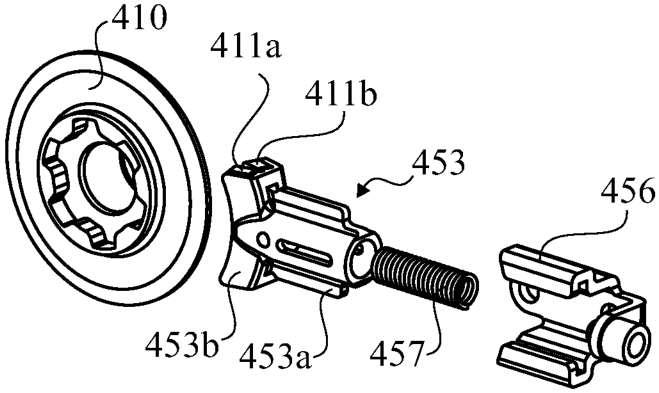
FIG. 33 is an exploded view of the components of the disk brake assembly of FIG. 32.

FIGS. 32 and 33 show a disc brake assembly that is suitable for use as a coasting brake and is an alternative to the coasting brake embodiments shown in FIGS. 11-26. The disc brake assembly comprises a brake disc 410 to be mounted to rotate with the saw chain sprocket, a caliper 453 carrying brake pads 411*a*, 411*b*, a caliper support 456, in which the caliper 453 is movable in a substantially radial direction towards and away from the brake disc 410, and a compression spring 457 supported between the caliper support 456 and the caliper 453 for pressing the brake pads 411*a*, 411*b* against the brake disc 410. The caliper support 456 is fixed in the housing of the chainsaw. The brake pads 411*a*, 411*b* form an acute angle with each other, and the brake disc 410 has a correspondingly tapered peripheral portion. To permit an automatic minor adjustment of the pads 411*a*, 411*b* in relation to the disc 410, the caliper 453 may have a body 453*a* carrying a slightly pivotal head 453*b*, on which the pads 411*a*, 411*b* are mounted. The brake pads 411*a*, 411*b* constitute a first brake member and the tapered peripheral portion of the brake disc 410 constitutes a cooperating second brake member. As earlier, said one end of the force transmitting member 23 is attached to the throttle trigger member 8, while the other end here (not shown) is attached to the caliper 453, so that a pulling action in the force transmitting member 23 compresses the spring 457 and releases the grip of the brake pads 411*a*, 411*b* against the brake disc 410.

Whereas the invention has been shown and described in connection with the preferred embodiments thereof it will be understood that many modifications, substitutions, and additions may be made which are within the intended broad scope of the following claims. From the foregoing, it can be seen that the present invention accomplishes at least one of the stated objectives.

The present invention has been described above in connection with a handheld engine-driven chain saw, but it can, of course, without any inventive activity be applied to any handheld engine-driven power tool, such as a hedge trimmer, for example.

Further even though the brake mechanism of FIGS. 2-7 has been shown to be mainly housed in the detachable clutch cover 6, often called outboard clutch, it is also possible to have an inboard clutch, i.e. having the clutch inboard the drive sprocket, as for example in Husqvarna 372 XP.

Further the front link 17 and the hand guard 7 do not need to have a common pivot 16, rather the hand guard 7 could be indirect connected to the front link 17 in order to affect it, e.g. the hand guard 7 having an own separate pivot and being connected to the front link 17 through a wire or a connecting rod.

Further, even if the hand guard 7 has been described as the actuator releasing the kick back brake, other releasing actuators are of course within the scope of the invention, such as for example a dead man grip mechanism. We have used the generic term kick back actuators 7 for such releasing actuators, where the hand guard 7 is an example. And further, even though the described embodiment shows only a single kick back actuator 7, it is of course within the scope of the invention to have a power tool having a plurality of kick back actuators 7.

Regarding the brake bands shown with slit longitudinal portions; the slit portions may of course be of different widths.

Further, even if it preferred that the coasting brake and the kickback brake are band brakes, it would of course be possible to use any kind of independent brakes when having the coasting brake and the kickback brake arranged on one side of the drive sprocket 37 respectively. For instance the coasting brake could be in the form of a brake shoe.

The invention claimed is:

1. A coasting brake arrangement for a power tool having a work tool, which coasting brake arrangement comprises:

a speed controlling throttle trigger member;

a force transmitting cable member having one end operatively connected to the throttle trigger member and another end operatively connected to a first brake member, which is biased towards a cooperating rotary second brake member that rotates when the work tool is running, so that the work tool is free to run when the throttle trigger member is pushed in but braked when the throttle trigger member is released to make the first brake member press against the second brake member in order to prevent the work tool from running, a mechanism connects said one end of the cable member to the throttle trigger member and is designed to restrict pulling of the cable member to an initial phase of the pushing in of the throttle trigger member;

wherein the throttle trigger member is mounted in a rear handle of the power tool and includes a throttle trigger button and an arm extending from the throttle trigger button in the direction of the rear handle, the arm being at least partially journalled inside the rear handle to permit pivotal movement of the throttle trigger button, said mechanism including a cam and a cam follower that is operatively connected to said one end of the cable member, the brake members being firmly pressed against each other when the throttle trigger button is released, but on pushing in the throttle trigger button, a relative movement between the cam and the cam follower causes the cam follower to pull the cable member to separate the brake members from each other to release the work tool for rotation; and wherein the cam has a cam surface shaped as a part of a cylinder at constant distance from the pivotal axis of the throttle trigger arm, whereby on further pushing in of the throttle trigger button, the cam follower rests against the cam surface without further pulling the cable member.

2. The coasting brake arrangement as claimed in claim 1, wherein said cam follower having a nose and a lock for said one end of the cable member, the nose of the cam follower has a rotary roller for reducing friction against the cam.

3. The coasting brake arrangement as claimed in claim 1, wherein said cam follower having a nose and a lock for said one end of the cable member, the nose of the cam follower is provided with a groove serving as a guide for the cable member during the rotation of the cam follower.

4. The coasting brake arrangement as claimed in claim 1, wherein the cam is carried by the throttle trigger arm, and that the cam follower is mounted in the rear handle of the saw to be movable in a direction substantially parallel to that of the arm, the cam follower having a sloping cam follower surface portion, which has a distant end and a near end in relation to the pivotal axis of the throttle trigger arm, so that on pushing in the throttle trigger button, the distance from said near end to the pivotal axis of the throttle trigger arm is gradually increased, the cam follower being secured to said one end of the cable member so as to be displaced substantially along the throttle trigger arm by the pivotal movement of throttle trigger member.

5. The coasting brake arrangement as claimed in claim 4, wherein on further pushing in of the throttle trigger button, the cam follower rests against the cam surface without pulling the cable member harder.

6. The coasting brake arrangement as claimed in claim 4, wherein cable member is the force transmitting cable member of a Bowden cable.

7. The coasting brake arrangement as claimed in claim 1, wherein the cam is fixed in the rear handle of the saw and has a first cam surface portion, which has a near end and a far end in relation to a pivotal axis of the throttle trigger arm, and a second cam surface portion located at a constant distance from the pivotal axis, the cam follower being secured to said one end of the cable member and mounted to follow the pivotal movement of the throttle trigger arm while moving axially therealong.

8. The coasting brake arrangement as claimed in claim 1, wherein the cable member is connected to a disc brake assembly comprising a brake disc-mounted to rotate with the work tool, a caliper carrying brake pads, a caliper support, in which the caliper is movable towards and away from the brake disc, and a compression spring supported between the caliper support and the caliper for pressing the brake pads against the brake disc, the brake pads constituting the first brake member and the brake disc constituting the cooperating rotary second brake member.

9. The coasting brake arrangement as claimed in claim 1, wherein the cam is carried by the throttle trigger arm, the cable member is a force transmitting cable member of a Bowden cable, and said mechanism further includes a shaft member carried internally in the handle and located near the throttle trigger button, the cam follower being journalled on the shaft member, said cam follower having a nose and a lock for said one end of the cable member, the cam follower nose resting on the cam when the throttle trigger button is released, but on pushing in the throttle trigger button, the cam lifts the cam follower nose to rotate the cam follower on the shaft member and thereby pull the cable member to separate the brake members from each other to release the work tool for rotation.

* * * * *